(12) United States Patent
Meszaros et al.

(10) Patent No.: US 6,255,983 B1
(45) Date of Patent: Jul. 3, 2001

(54) DEGASSER GUIDE

(75) Inventors: Gregory A. Meszaros, Pittsburgh, PA (US); Frank L. Kemeny, Grand Island, NY (US); David J. Walker, Mississauga (CA); Richard J. Zaranek; Frederick J. Mannion, both of PIttsburgh, PA (US)

(73) Assignee: USX Corp, Pittsburgh, PA (US)

( * ) Notice: Subject to any disclaimer, the term of this patent is extended or adjusted under 35 U.S.C. 154(b) by 0 days.

(21) Appl. No.: 09/519,370

(22) Filed: Mar. 6, 2000

Related U.S. Application Data

(63) Continuation-in-part of application No. 09/354,216, filed on Jul. 15, 1999, now Pat. No. 6,166,681, which is a continuation-in-part of application No. 09/135,617, filed on Aug. 18, 1998, now Pat. No. 6,130,637.

(51) Int. Cl.$^7$ ........................................... G01S 13/88
(52) U.S. Cl. ............................. 342/124; 266/94
(58) Field of Search .................. 342/124, 129; 75/510; 266/94, 208

(56) References Cited

U.S. PATENT DOCUMENTS

| | | | |
|---|---|---|---|
| 3,663,204 | 5/1972 | Jungwirth | 75/49 |
| 3,701,518 | 10/1972 | Herff | 266/34 LM |
| 4,150,974 | * 4/1979 | Kemlo | 75/60 |
| 4,235,423 | * 11/1980 | Kemlo | 266/99 |
| 5,182,565 | 1/1993 | Nagamune et al. | 342/124 |
| 5,614,911 | 3/1997 | Otto et al. | 342/124 |
| 5,629,706 | 5/1997 | Baath | 342/124 |
| 5,651,286 | 7/1997 | Champion et al. | 73/290 V |
| 5,827,474 | 10/1998 | Usher et al. | 266/44 |

OTHER PUBLICATIONS

"The Making, Shaping, and Treating of Steel" USX Corporation, pp. 680–681.

* cited by examiner

*Primary Examiner*—Ian J. Lobo
(74) *Attorney, Agent, or Firm*—William L. Krayer

(57) ABSTRACT

Radar is used to measure not only the level of slag on molten steel but also its thickness; the measurement is used to calculate the volume of slag, and, in turn the amount of additives for slag treatment. Time-of-flight data are used to identify peaks representing the distances of the surfaces of the slag and the surface of the underlying steel. The concept is applicable to other materials of differing composition, and particularly where the underlying material is relatively more conductive than the overlying material. Degassing is more efficiently practiced by using the radar slag thickness determinations to assist in vertical placement of snorkels.

14 Claims, 11 Drawing Sheets

Heat 1 Raw data

Heat 1 Processed data

Heat 2 Raw data

Heat 2 Processed data

Combined Raw Data for All 3 Heats

Combined Processed Data for All 3 Heats

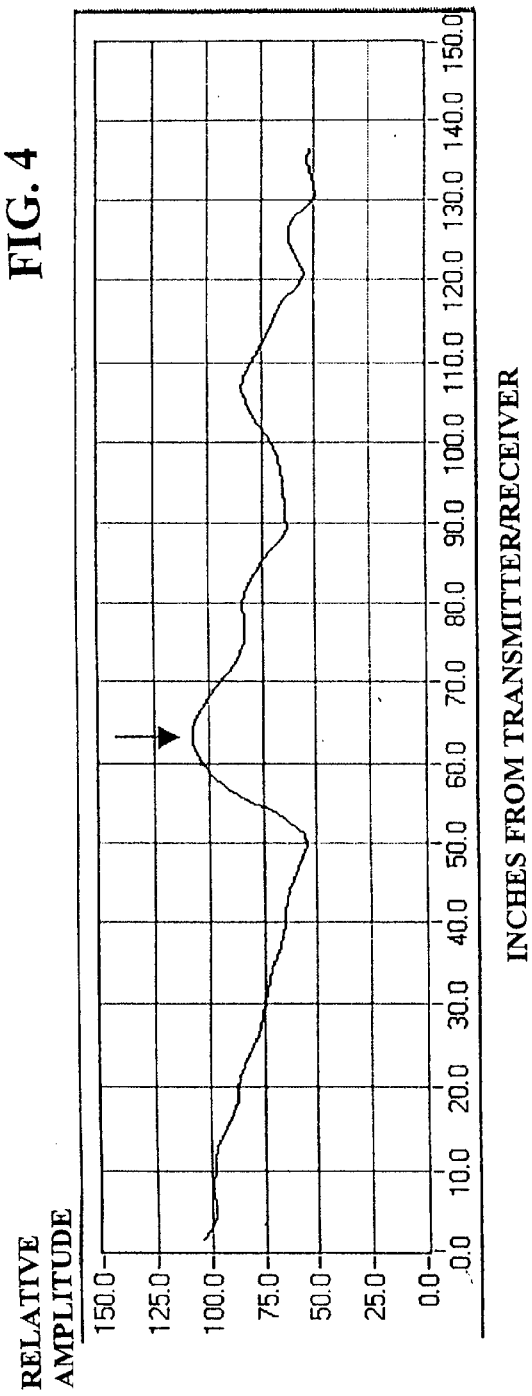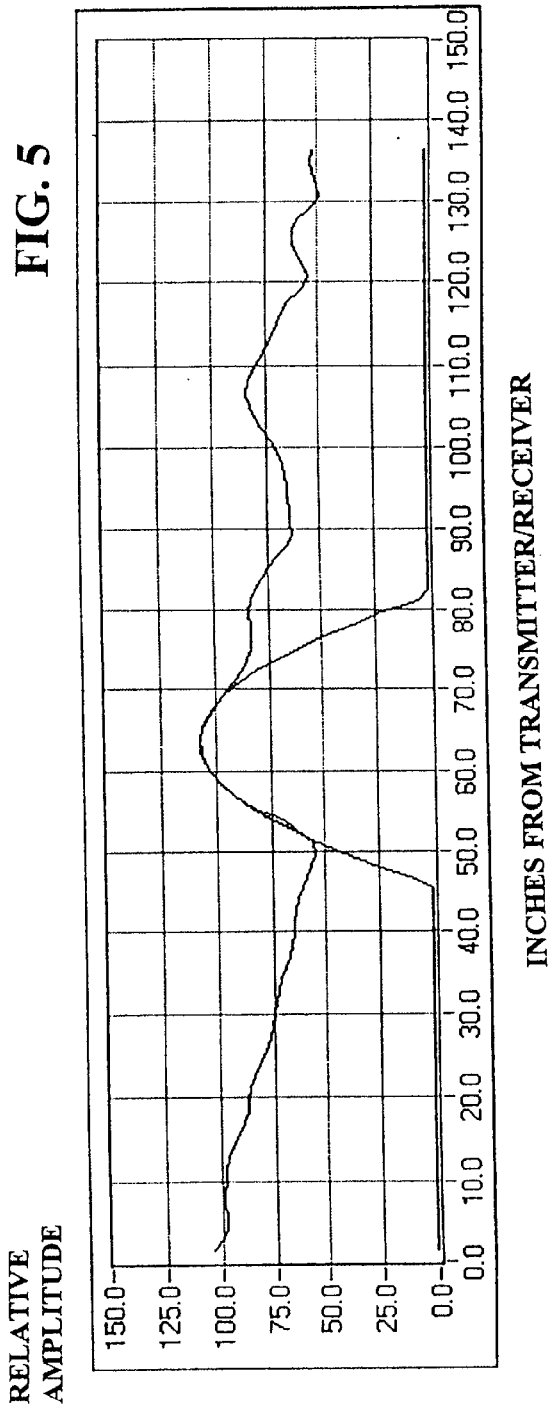

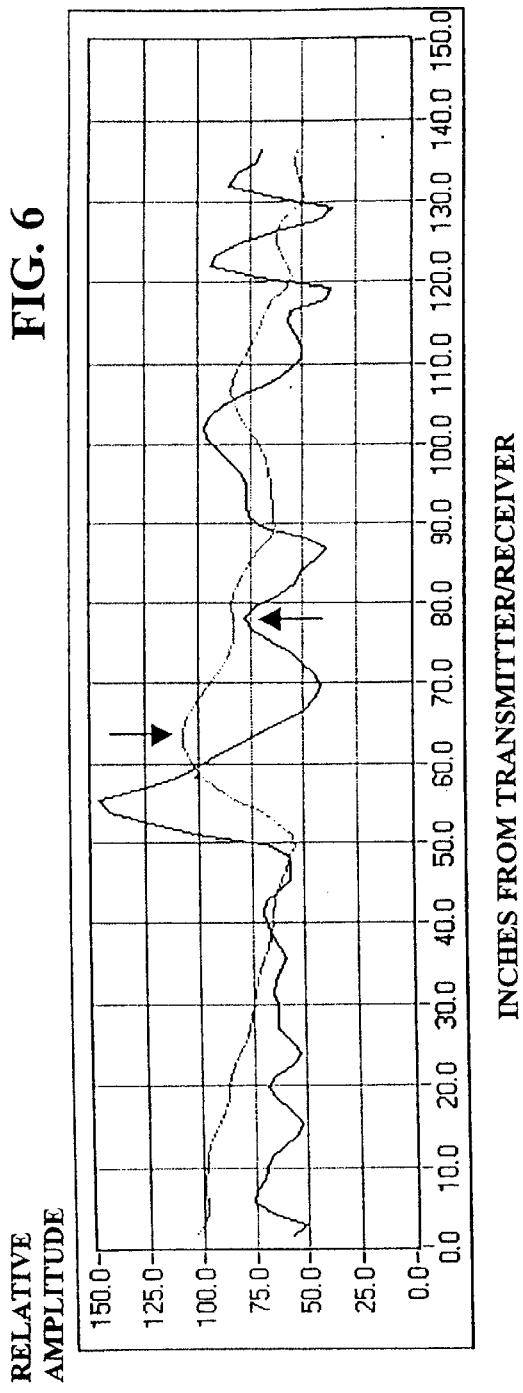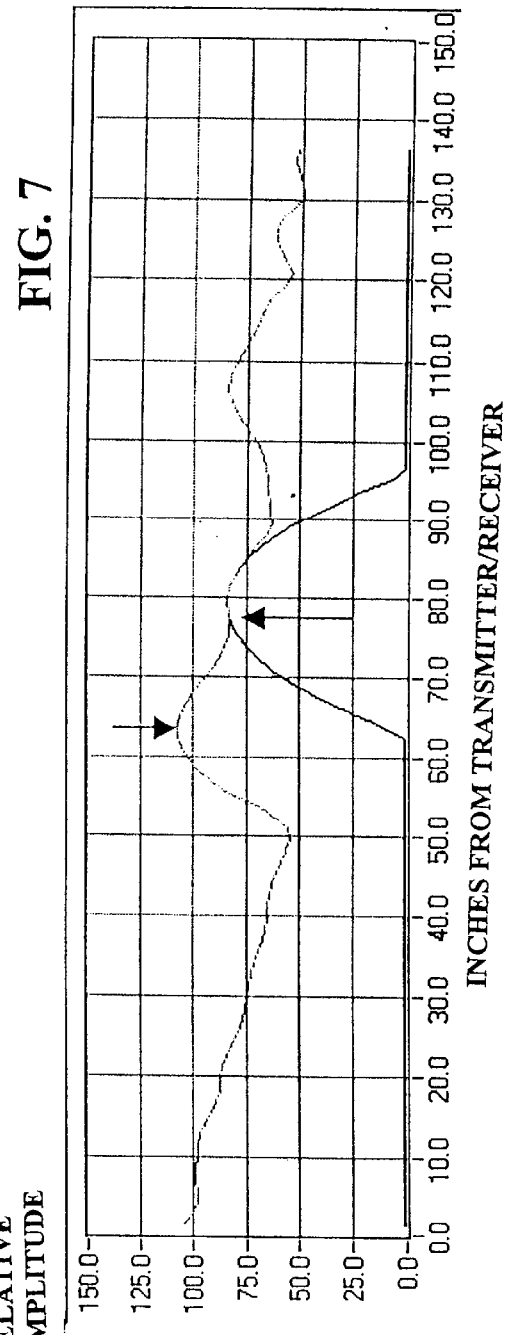

DEGASSER GUIDE

RELATED APPLICATION

This is a continuation-in-part of now U.S. Pat. No. 6,166,681 filed Jul. 15, 1999, which is entitled "Measuring the Thickness of Materials". That application is a continuation-in-part of now U.S. Pat. No. 6,130,637, filed Aug. 18, 1998, entitled "Measuring the Thickness of Hot Slag in Steelmaking"

TECHNICAL FIELD

This invention relates to apparatus and methods for measuring the thickness of slag on the top of a vessel of molten steel or other molten metal. An improved knowledge of the thickness of the slag, and hence its quantity, permits improved control of the amount of iron oxides and other constituents of the slag. The invention therefore includes methods and apparatus for controlling the chemistry of slag in steelmaking vessels. It also encompasses estimating the average top level of the slag, and estimating the volume above the surface of the slag which is available for additions to the vessel. In addition, it provides methods and apparatus for degassing molten steel and in particular the accurate placement of a degasser in a ladle of molten metal.

Our invention is applicable generally to the measurement of the thickness of a layer of one material on top of another material, through the use of microwave radar.

BACKGROUND OF THE INVENTION

Microwave radar has been used for years to measure the levels of various substances. The basic principle is known that the distance from the radar sender/receiver to the object under scrutiny is directly related to the time expiring between sending and receiving the radar signal, and the distance is accordingly readily computed from the elapsed time. In recent years, smaller and less expensive radar systems have become available, and their accuracy has been improved so that relatively close objects and levels of materials can be measured with confidence. The art has learned to measure or compensate for turbulence as well as unevenness in surfaces. Radar microwave is excellent for measuring a level below a layer of foam, which is otherwise hidden from view. Radar can penetrate the covers of some vessels, such as plastic lids, to determine the level of materials beneath them. The ability of contemporary computers to handle large quantities of data has also expanded the potential for radar usage.

The production of steel is historically a batch process comprising an oxidizing (or basic oxygen process) stage and a refining, or reducing stage. Generally, after the basic oxygen process, the co-produced slag floating on top of the molten steel will have a high iron oxide content and a high manganese oxide content. This slag follows the molten steel when it is poured into ladles and other vessels. The slag must be treated to reduce the iron oxide content.

If the iron oxide content of the slag is not reduced in the process of making aluminum deoxidized steel, the alumina that forms can cause caster nozzle clogging and surface defects. On the other hand, if the slag is excessively deoxidized, such that the resulting sum of iron and manganese oxides is less than 2%, then complex magnesium aluminate spinel inclusions may form. These can also cause nozzle clogging and quality defects. Furthermore, if too much slag reducing agent is added, the steel chemistry may be changed and miss the product specifications. The operators must also be aware if there is not enough free volume, or "freeboard" above the slag to accommodate the additional volume of slag treating agents to be added.

Although the concentration of iron oxide in the slag may be determined reasonably accurately, it has been difficult to determine the quantity of slag present, and many approaches have been followed to measure the thickness of the slag in order to decide how much aluminum, calcium carbide, or silicon to add to reduce the iron oxide. For example, a slag depth approximation may be computed from overall weight and the top slag level, since slag density can be determined reasonably accurately.

See Richard E. Kracich and Kenneth Goodson, "Ladle Slag Depth Measurement", 1996 Steelmaking Conference Proceedings, 53–60. In this paper, the authors describe a slag depth measuring system including measuring the lower level of slag by a "slag/steel interface electronics" coil, a probe which must penetrate the slag layer and beyond, where the induction effects of the coil are changed by the presence of the molten steel. Other kinds of probes used in the past include simple steel bars; the bar is inserted until its extremity is melted by the molten steel, and the thickness of the slag is assumed to be the length of the red-hot portion after the bar is pulled out. But frequently the upper crust of the slag does not heat the bar enough. Any device which must penetrate the slag to measure its depth must be expected not to last very long. Moreover, slag depth varies over its area, and the single probe techniques do not account for such variations. Nevertheless, such devices can often be relied upon at least for determination of the upper level of the molten steel, which is relatively constant and can be measured reliably at a single point.

Tezuka and Nagamune, in a paper entitled "M-Sequence Modulated Microwave Level Meter and its Application" presented at the 1994 Steelmaking Conference Proceedings, 181–185, describe the measurement of the level of molten iron in a moving car, using a microwave technique; they also measure the top level of slag in a vessel. However, the microwave emissions were not shaped and accordingly a large portion of radiation received represented reflections from the sides of the vessels.

We are interested in determining not merely the upper level of the slag, but the lower level as well, so we can calculate the quantity of slag to be treated with reducing and other materials, such as aluminum or calcium carbide. It may be noted that the above mentioned Kracich and Goodson paper contains the following statement: "A microwave unit for measuring slag depth was tested, but was not feasible due to time constraints, cost and durability in the harsh environment." Our technique has overcome these problems and many others we encountered.

In addition, we are interested in determining the thickness of various materials residing on others.

This continuation-in-part entitled "Degasser Guide" is directed to the use of radar measurements of slag levels and thickness to enable the accurate placement of a vacuum degasser in steelmaking. The most common contemporary degassing processes use a degassing chamber positioned above the ladle; the molten steel is caused by vacuum to flow into the chamber where dissolved gases, such as oxygen, hydrogen and carbon monoxide, are removed by the applied vacuum. The chamber is equipped with one or two "snorkel" tubes which are lowered to penetrate through the slag layer and the steel is either repeatedly drawn into the chamber and released or it is caused to flow up one snorkel tube and down the other. Means are provided for lowering and raising the chamber and the tube(s). But without an accurate estimate of the thickness of the slag layer, it is difficult to direct the snorkel to the most efficient depth.

Refractories in the liquid metal contact areas (the snorkels, throat and lower sidewall) are susceptible to corrosion due to reactions with the steel and slag. Refractory erosion in these areas results from the highly turbulent steel and slag washing over the refractory hot-face. Contamination of the ladle top slag must be minimized, as iron oxide (FeO) attack, resulting from the oxidation of residual steel left in the vessel after treatment can result in erosion and corrosion of refractories if temperatures are high enough to create liquid formation.

It is known to add materials such as ferrosilicon, aluminum, carbon and ferromanganese to the steel while it is being degassed.

Our invention as applied to positioning of the degassing chamber and the snorkel is also useful and in all ways compatible with the treatment of steel with additives during degassing.

SUMMARY OF THE INVENTION

Radar reflectance is highly dependent on the conductivity and, to an extent, the dielectric constant of the material or surface to be contacted or measured. Highly conductive subjects, such as acids and graphite, reflect microwaves very well, more or less independently of the dielectric constant so that these materials can be measured with few problems. Generally, electrically conductive materials having a dielectric constant greater than 1.5 have sufficiently good reflection characteristics for reliable radar measurement. If the material in question is nonconductive, an appropriate dielectric constant is desirable for sufficient reflection. Typically, steelmaking slag has a dielectric constant that will reflect radar sufficiently for a measurement. Compositions of slags vary, but steelmaking slags may be expected to have electrical conductivities $\lambda$ of about $\lambda=0.5$ to $1.5 \ \Omega^{-1} \ cm^{-1}$ and ladle slags about $\lambda=0.4$ to $0.7 \ \Omega^{-1}$. Steel is generally highly conductive and accordingly strongly reflects radar pulses. Liquid low alloy steel may be expected to have an electrical conductivity of about $\lambda=7140 \ \Omega^{-1} \ cm^{-1}$ at steelmaking temperatures. The marked difference in conductivity—a factor of about 7000—between slag and molten steel is very favorable for the use of radar to determine the position of the interface of the slag and the molten steel.

Our invention employs a microwave transmitter and receiver, sometimes herein called a transceiver because the antenna unit which transmits the microwave radiation also receives the reflection, although it is within the concept of our invention to employ two separate antennas, and our use of the term transceiver is intended to include either a single module unit which both sends and receives or completely separate transmitting and receiving devices. In our preferred mode, the transceiver is deployed temporarily over the vessel containing the molten steel and slag. Microwave radiation is aimed at the center of the vessel preferably shaped in a conical pattern having a base calculated to describe a circular area comprising about 1–80%, preferably about 1–50%, and most preferably about 3–20% of the slag surface.

Some of the microwave radiation is reflected from the slag surface so that the upper level of the slag may be determined, but our invention also recognizes that some of the radiation penetrates the slag entirely and is reflected from the surface of the underlying molten steel. We therefore determine the distance from the radar device of both the upper and the lower surfaces of the slag; the difference is the thickness of the slag, and we determine the quantity of slag present from the calculated thickness and the dimensions of the vessel. We need not use separate radiation emissions for the upper and lower surface determinations but such separate signals are within the invention.

It should be noted that the percent of the area measured is not important so long as it is a large enough sample of the slag area to be statistically representative of the slag as a whole. That is, the slag volume is calculated as the product of the measured thickness and the known area of the vessel—the area actually used for the thickness measurement need not enter into the calculation.

Whether we use a single transmission for the upper and lower surfaces of the slag, or separate transmissions of different frequencies chosen for optimum reflectivity from the slag and steel surfaces, we first, preferably, generate an experiential data base for the computer software which will process the raw echo data. Preferably a data base will be obtained, for example, for each vessel which will hold the molten steel and associated slag. Data may be accumulated particularly to determine false echoes in an empty vessel, and historical data may be compiled for known molten steel/slag levels in the vessel. The software will then be adjusted to discard false and "ghost" echoes, adjust for various conical angles, and otherwise optimize the processing of the received pulses.

The transmissions and echoes are subject to several phenomena which must be interpreted—some of the microwaves are reflected from the surface of the slag, some partially penetrate the slag and are reflected from its interior, and some are reflected from the surface of the molten steel. Other portions of the microwaves may be received as "false" echoes from the sides of the vessel and elsewhere, and will be recognized as such by the computer and filtered out.

We have recognized that the distance profile of the slag printed out by the instruments we use has a characteristic pattern and the distance profile of the molten steel has a quite different characteristic pattern. Whether these patterns are discerned as raw data or as processed data, they will be recognizable by computers or humans and they will be further recognized as juxtaposed with the slag-characteristic pattern on top. We are thus able to determine at least approximately the distance of the slag/steel interface from the radar unit as well as the distance of the slag surface from the radar unit.

Such patterns are discernible whether or not a more or less customized data base is used, such as described above. That is, the software algorithms are designed to filter out false echoes and extraneous signals for applications to vessels of various types, shapes, and sizes.

The Vega radar unit, working with a computer equipped with "Echofox" software, used to collect the data discussed below generates a rounded cusp immediately adjacent to a level area. The rounded cusp is indicated to be at a distance approximately predictable for the slag, and the left (or high) end of the level portion of the profile is near the approximately predictable distance for the upper level of the molten steel. The characteristic rounded cusp representing the slag is apparently caused not only by the dielectric constant and conductivity of the slag, but also by its multi-faceted and heterogeneous composition, resulting in a dispersion of reflections and possibly minute refractions. The broad base of the rounded cusp is, we believe (although we do not intend to be bound by any theories), a function of the nonuniformity of the surface of the slag. If this is so, the rounded cusp may in part overlap the actual level of the molten steel surface as reported in the computer printouts. The level line characteristic of the molten steel is also an artifact of the software. We are not certain whether the straight line represents actual radar reception from the levels indicated, or is indicative of the absence of data for points below the surface of the steel. It is clear, however, that there are two distinct types of data approximately at the levels above and below the surface of the slag. Thus the point or level at which there is an abrupt change in patterns from a rounded cusp to a level line may represent the slag/steel interface. As indicated above, this is quite consistent with the abrupt change in electrical conductivity from the slag to the molten steel. Of course the data can be manipulated to provide different patterns, but the slag and steel data will be recognizably next to each other, and we can utilize that fact, regardless of how the data are presented, to do our calculations of slag depth. Note that this principle may be followed even if the level line is an artifact of a program or algorithm which causes the level line to be printed even if there is no data beyond a certain distance—that is, if the radar is completely reflected from the surface of the steel. The software may also manipulate the data to indicate the average upper level of the slag, and may utilize various principles of statistics to present the data in various ways. It is possible, as indicated above, or even likely, that the breadth of the base of the rounded cusp has a positive correlation to the roughness of the topography of the slag, and that the cusp therefore overlaps the actual distance of the interface of slag and steel.

Thus we predetermine the approximate distances from the radar unit for the upper and lower surfaces of the slag, cause the radar unit to emit pulses, record the reflections in a manner to generate a surface distance profile, and correlate the resulting rounded cusp adjacent to a level area to the upper and lower slag surfaces. The positions of these portions of the profile represent the distances from the radar unit.

Slag has been seen to be partially transparent to microwave radiation of frequencies of 5 to 25 GHz; we therefore may employ two separate pulses of different pulse frequencies to obtain distance readings for the upper and lower surfaces. Our preferred microwave frequency when using a single frequency is 6.3 GHz The advantages of using a microwave of 6.3 GHz is that this frequency does not require FCC approval and has a low emitting energy that is not detrimental to humans.

Our invention includes a method of controlling the addition of reducing agents such as aluminum, calcium carbide and/or silicon to the slag which comprises determining the distances from a microwave energy receiver of the upper and lower surfaces of slag, calculating the thickness of the slag and the quantity of slag present from such distances and the dimensions of the vessel, and calculating a desired reducing agent addition based on the quantity of slag present and the concentration of iron oxide, manganese oxide, and/or other oxides in the slag.

More particularly, our invention includes a method of measuring the thickness of slag on molten metal by measuring microwave reflectance (time of flight) from the surface of the slag and microwave reflectance from the surface of molten metal underlying the slag by identifying microwave radiation which is transparent to the slag but reflected from the metal surface. Our invention is not limited to the measurement of slag thickness on molten steel, but may be used in other metallurgical contexts, i.e. in any situation where molten slag or dross is on top of molten metal, including nonferrous metals.

In further particularity, our invention may be used to measure the thickness of dross or slag on top of vessels of molten aluminum, copper, nickel, zinc, gold, silver, platinum, titanium, chromium tungsten, tin, lead, and any other elemental metal or alloy such as brass, pewter, solder, or the like during separation, purification, refinement, manufacture or storage. Generally, both materials should have substantially planar surfaces. We use the term slag to include dross and other scoria. Our invention is not limited to the measurement of molten slag or dross (generically, scoria) on top of molten metal, but may also be used where one or both of the materials is solid, and in separation processes, where the refined or desired product is on top of a material to be discarded as well as the opposite relationship.

Also more specifically, our invention includes the concept of striking the surface of molten slag with microwave radiation shaped to reflect from a portion of the surface in a predetermined geometric shape. Data representing the reflections from the predetermined geometrically shaped surface area are processed to determine the average distance of the slag surface within it from the radar transceiver, and this average distance is used as the average distance of the entire top surface of the slag. This distance is used in computing the thickness, and the volume, of the slag. The lower level of the slag may be determined for this purpose by radar as explained elsewhere herein or by means other than radar.

Our invention includes the use of multiple radar measurements. We have determined that the distance from the radar transceiver to the upper surface of the lower material, such as molten metal underneath slag or dross, is more readily determined by a more concentrated or focused pattern and the smoothness or roughness characteristics of the upper surface of the upper material, such as molten slag, is more accurately determined by a wide area pattern. Thus it is advantageous to combine the two approaches. In one mode of this variation of the invention, the microwave head is placed at different distances from the target in order to obtain different areas of reflectance on the target, using the same original conical angle. Placement further away makes a larger circular pattern on the target, and a closer placement makes a smaller one. In a preferred mode of our invention, we transmit the radar from the same height but at two different conical angles. In either case the large circular pattern is preferably an area about 10% to about 80% of the area of the upper material or slag, and the smaller circular area is preferably about 1% to about 20 percent of the area of the upper material or slag. Another preferred relationship is that the upper material pattern is from 2 to 10 times the area of the lower material pattern. The two signals can be transmitted within a very short time of each other, i.e. within nanoseconds, and accordingly even if the material is moving, the patterns are imposed practically instantaneously. In most instances it is not necessary to take successive measurements within less than a second of each other; in fact where the data processing requires more than a few seconds, it may be advantageous to time the second measurement after completion of the data processing function for the first measurement. Of course the interval between measurements may simply be dependent on the time necessary to move the transceiver Moreover, one of the signals can be stronger than the other. Preferably, where signals of different strengths are used, the stronger one is the more focused (i.e. smaller conical angle) one. Because the two transmissions are by definition separate, we can easily analyze their reception separately, and the composite results are more accurate for both the upper and lower surfaces of the slag or other upper material.

In this continuation-in-part "Degasser Guide", we describe and claim the use of our radar slag measurement techniques to aid or control the insertion of a degasser snorkel into a ladle of molten steel covered by a layer of molten slag. Our invention comprises a method of positioning a vacuum degasser in a ladle of molten metal covered by slag, in which molten metal is drawn into the vacuum degasser by a vacuum applied through a tube having a molten metal intake end, comprising determining, by radar, the level of molten metal in the ladle and under the slag, and controlling the lowering of the tube intake end into the molten metal at least partly by a signal representing the level as determined by radar.

The invention includes, after the tube intake end is lowered into the molten metal, further applying vacuum to the tube intake end to draw molten metal into the vacuum degasser, removing gases dissolved in the molten metal by the vacuum, and permitting the molten metal to drain back into the ladle. In addition, it includes an aspect in which the lowering og the tube intake end is controlled at least partly by a signal representing the location of the degasser or the molten metal intake end of the tube.

During the degassing process, additives such as ferrosilicon, aluminum, carbon and ferromanganese may be dispensed into the molten steel. Our invention combines the efficient placement of the snorkel with the dispensing of additives to the steel. The operating temperature of the degasser is usually about 2700° F. to about 3200° F. but may be higher or lower.

BRIEF DESCRIPTION OF THE DRAWINGS

FIG. 4 shows the initial plot of radar data in terms of distance from the radar transceiver; FIG. 5 illustrates a technique for simplifying a reading of freeboard dimensions.

FIG. 6 shows an array of data for slag depth calculation and FIG. 7 further illustrates the slag depth calculation.

DETAILED DESCRIPTION OF THE INVENTION

Figure 1:
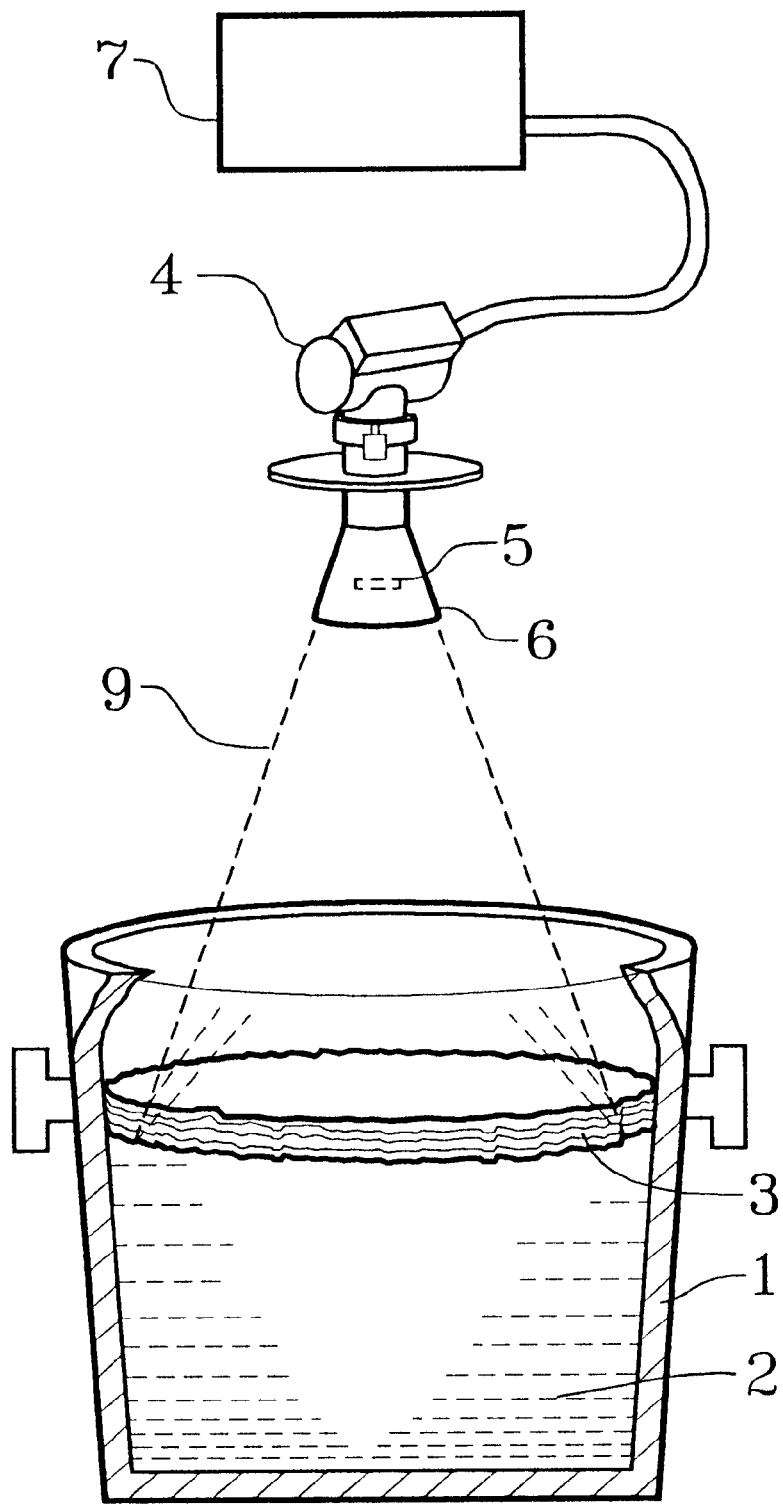
FIG. 1 is a side elevational view showing a vessel of molten steel and slag, and a radar unit overhead for taking readings of slag levels.

In FIG. 1, vessel 1 is on a rail car not shown. Vessel 1 contains molten steel 2 to be poured into a deoxidizing vessel in preparation for use in a continuous caster. Molten steel 2 is covered with a layer of slag 3 of unknown thickness. Overhead is radar transceiver 4 which includes an antenna 5 of polytetrafluoroethylene mounted in in conical waveguide 6. Radar transceiver 4 is connected to computer 7. Conical waveguide 6 guides the microwaves in a divergent, conical pattern 9 prior to striking slag 3.

In practice, the vessel 1 may be moved into position for the slag measurement by the rail car not shown or by a crane or other means. The radar transceiver 4 likewise is movable, and, as discussed elsewhere herein, it is desirable not to expose the unit for long periods to the high temperatures and atmosphere above the vessel. Ideally, the radar transceiver is retractable to a distance completely insulated from the heat of the molten materials so that it may be in its working position a few meters above the molten surface for only a few seconds.

Microwave radar transceiver 4 is an off-the-shelf device which transmits microwave radar pulses from antenna 5 towards a target, in our case a layer of molten slag 3. Portions of the pulses are reflected back to the antenna. The basic calculation of level is distance=speed*time/2. Distance is also a function of the strength of the received signal or echo, which may be expressed in decibels. Microwave electromagnetic waves travel at a velocity of approximaely 300,000 km/sec, such that for a microwave pulse frequency of 5.8 GHz, a distance of 1 meter requires a time of flight of 6.6 nanoseconds. The dimensions of conical waveguide 6 are chosen so that in the circumstances of the particular measurements to be taken, the microwave radiation will strike the slag in a circular pattern in the center of the circular layer of slag, preferably covering about 50% of the surface area. The basic calculation must be adjusted to compensate for the shape of the radiation and the area of the surface it strikes, to filter out reflections from the sides of the vessel, angularity of the surface, and other factors such as possible refractions or scattering by facets in the slag. Such adjustments are built into the presentation of the data below, which include both "raw data" and "processed data". The raw data are not entirely unprocessed, and persons skilled in the art will recognize that the radar echoes received by the antenna may be manipulated in many ways. Indeed, data representing the original emitted signal may be manipulated, for example, by algorithms to ensure the incorporation of the effect of the conical waveguide and/or a historical or experience-based compensation, or filter for the shape of a vessel which is used a number of times.

Figure 2:
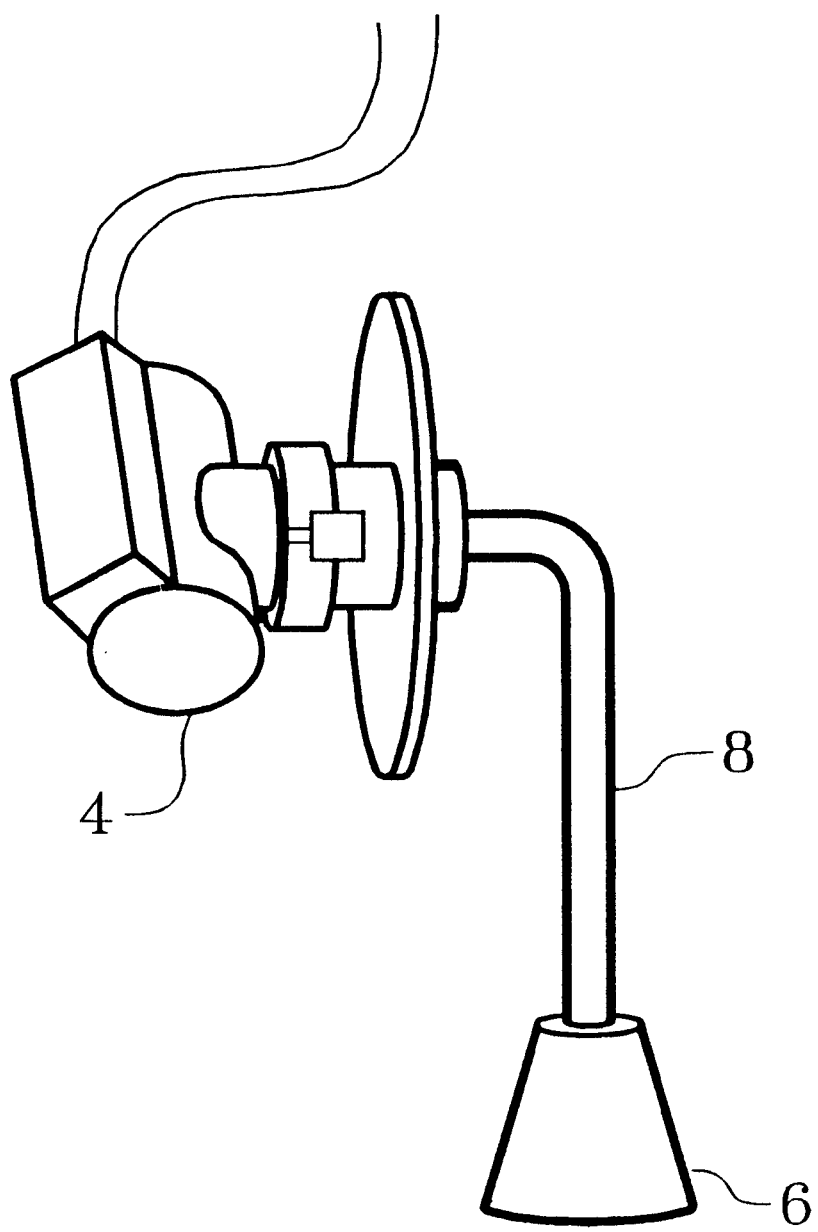
FIG. 2 is a detailed view of the radar system including a preferred waveguide and mechanism for lowering and withdrawing the radar system.

In FIG. 2, a variation of the radar transceiver 4 is shown which includes waveguide extension 8 between the radar transceiver 4 and conical waveguide 6. By the use of the waveguide extension 8, the unit 4 may be made more remote from and protected from the heat and atmosphere in the immediate vicinity of vessel 1 (FIG. 1). The entire assembly, including waveguide 6 and waveguide extension 8 may be retractable by mechanisms not shown.

Measurements were taken on several slag layers and are displayed in FIGS. 3a through 3h. For the tests reported in FIGS. 3a–3h, the emitting frequency was 6.3 GHz. The transceiver used was a VEGAPULS 81 made by VEGA Grieshaber KG, Am Hohenstein 113, Schiltach, Germany, using a horn (conical) antenna made of a heat-resistant alloy. The computer was loaded with ECHOFOX software for processing the data. Both the equipment and the software were obtained from OhmartVega of Cincinnati, Ohio. The apparatus was prepared by following the routines for "learning" false echos and for background and instructions to delete false echos during use. In these plots, the Y axis is expressed in terms of decibels, for the intensity of the reflected signals received by the antenna, but the Y axis units may represent a composite of factors as discussed elsewhere herein. The decibels are correlated to distances in the units on the X axis; the apparatus is thus able to present a repeatable profile, which may be distorted, of the surface(s) struck by the radiation.

The results for the tests conducted on three heats are shown in FIGS. 3a through 3h. For each of the heats we observed the surface of the slag either before or after the measurement. For each measurement, the process car was moved under the radar unit. Measurements were taken until no noticeable change in reading was observed. Both the raw data and processed data were recorded for each heat. While the separate raw and processed data has been included for each of the heats, it is interesting to focus on FIGS. 3g and 3h. These figures are the raw and processed data respectively for each heat combined onto two plots.

Figure 3A:
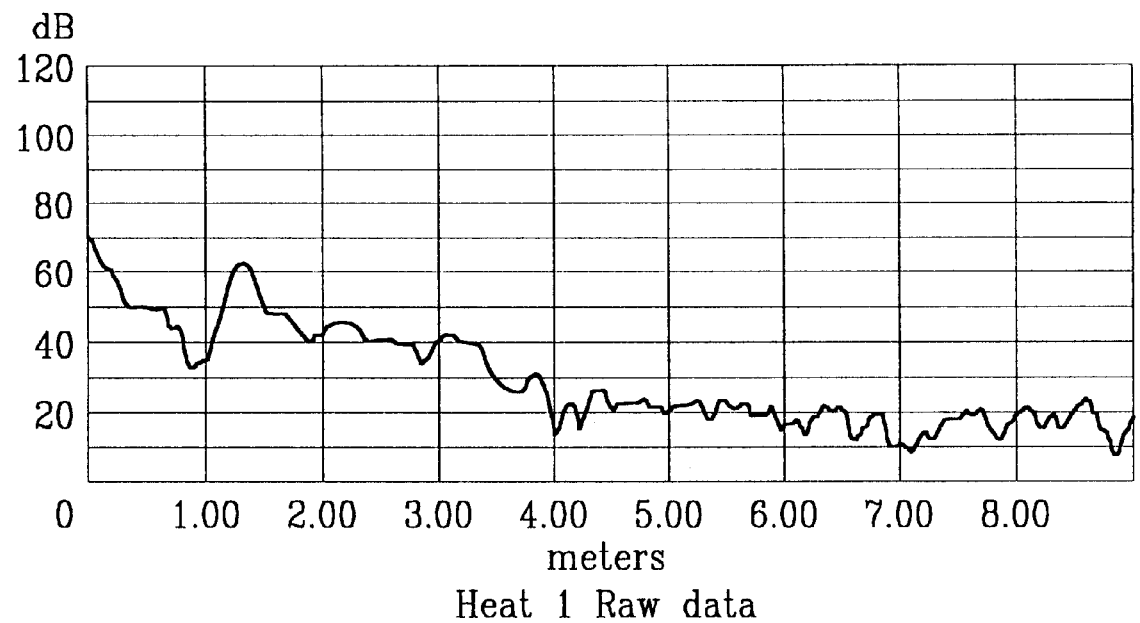
FIGS. 3a–3h are printouts of microwave reflection data showing characteristic patterns in the regions of the slag and the steel.
Figure 3B:
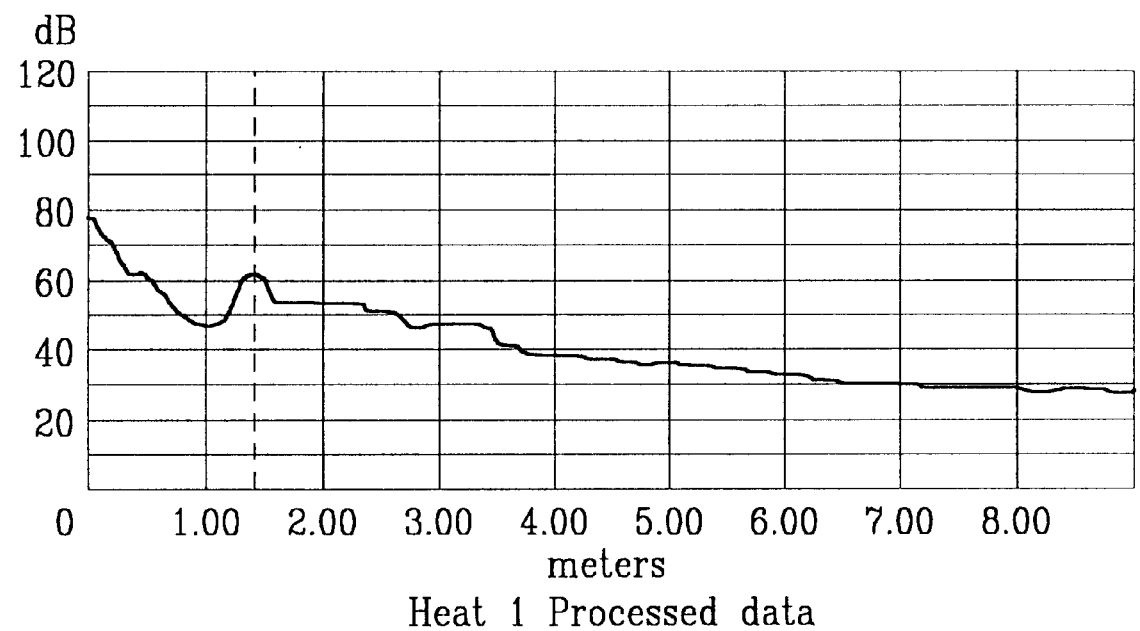
Figure 3C:
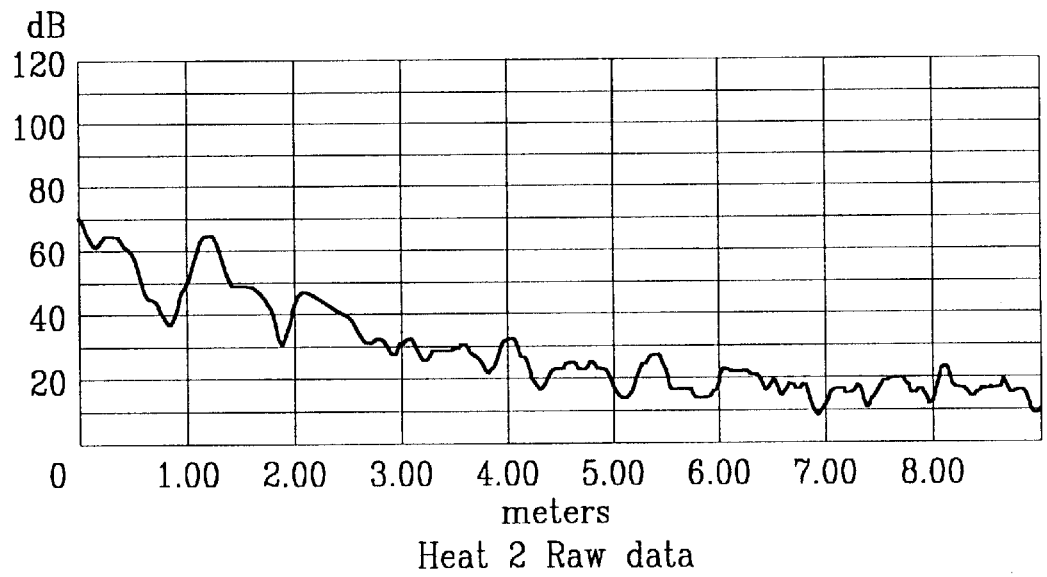
Figure 3D:
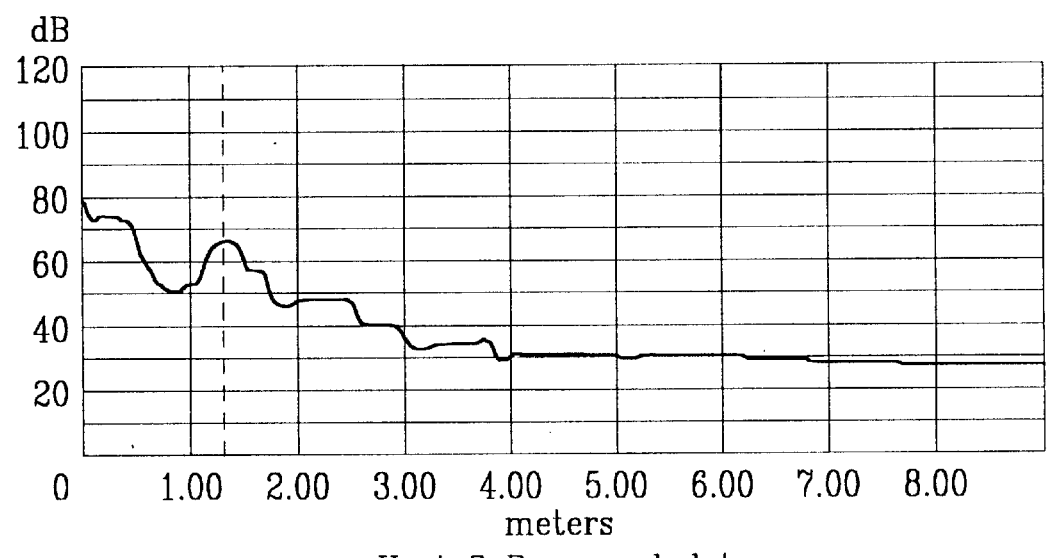
Figure 3E:
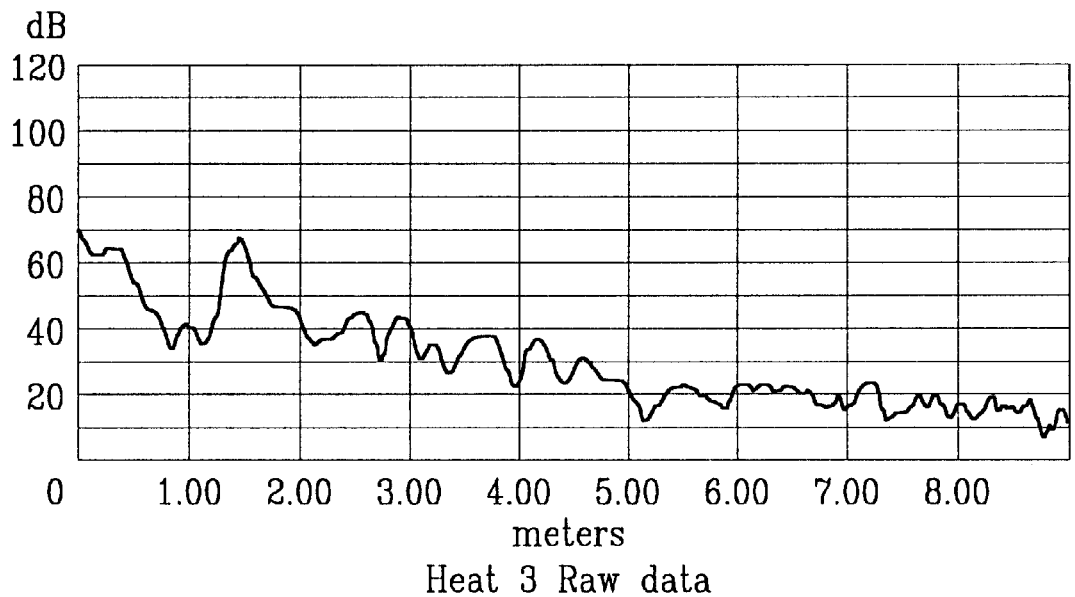
Figure 3F:
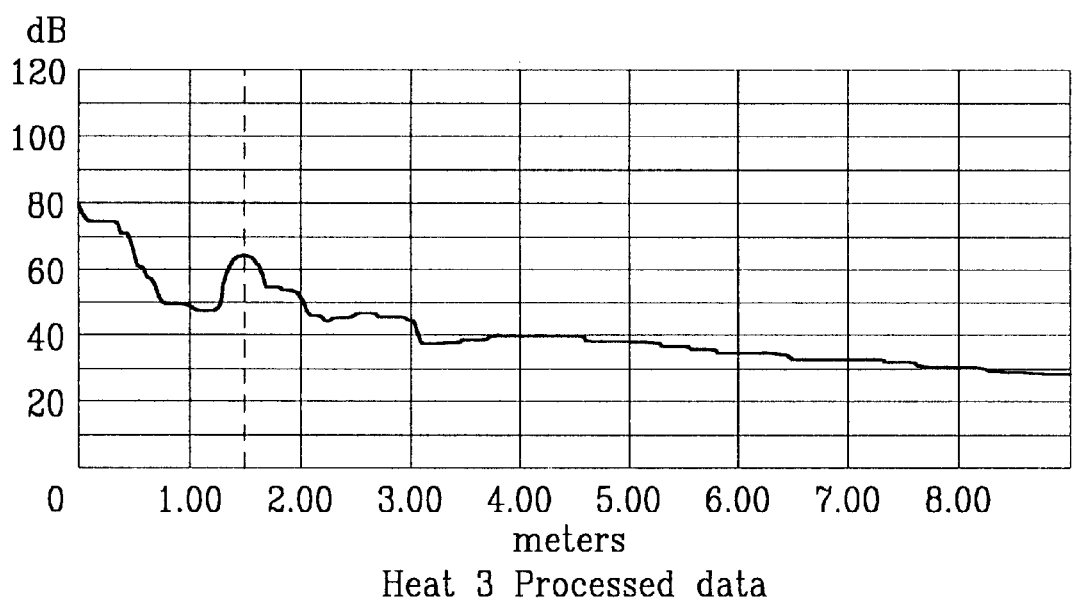
Figure 3G:
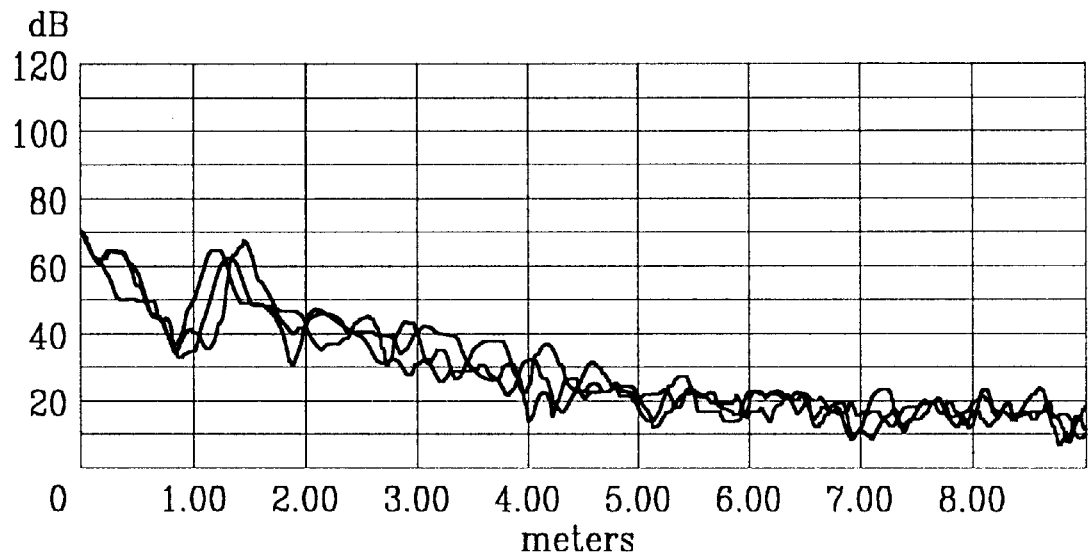
Figure 3H:
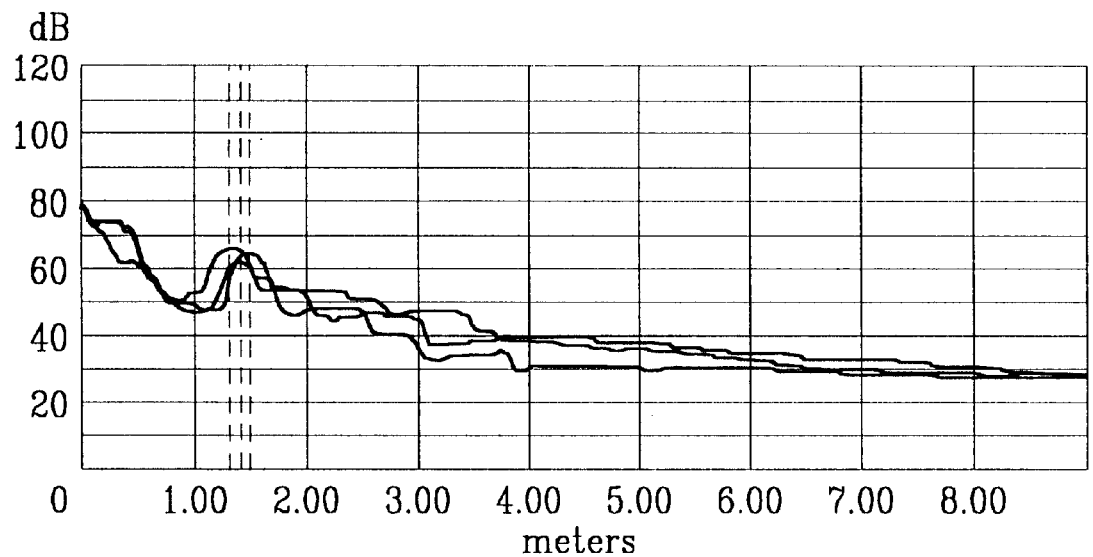

The raw data results in FIG. 3g show that each of the curves is unique in position, height, and width. This indicates that we are able to distinguish between differences in slag height from heat to heat. The processed data results in FIG. 3h show that the curves are similar in height and shape but at different positions. This may indicate slags of similar radar reflectance characteristics but at different heights in the ladle.

Reverting to FIG. 3a, the units on the X axis represent the distance in meters from the reflected surface to the echo signal receiver in the radar unit. The units on the Y axis are expressed in decibels, for the echo signal. The pulsed signal was emitted by the radar unit in a conical fashion as illustrated in FIGS. 1 and 2. For the first heat measured and reported in FIGS. 3a and 3b as raw data and processed data before processing the steel in a degasser, we observed that there was a level between about 1.6 meters and 2.3 meters which was flat, particularly in the processed data of FIG. 3b. The molten steel is very homogeneous and accordingly it may be assumed, although we do not intend to be bound by any theories, that the microwave radiation penetrated the slag, was reflected from the steel surface and at the same time, by one theory, was reflected uniformly from the incremental depths of penetration through the steel. Thus the horizontal line from about 1.6 to about 2.3 meters in FIG. 3b represents the molten steel, and, particularly important for our purposes, the left end of the line makes a clear intersection with the right bottom of the rounded cusp. A vertical dashed line has been inserted at about 1.4, the peak of the rounded cusp of slag data. Regardless of whether the straight line represents a constant amount of reflection from all levels of the molten steel, it is clear that its uppermost end is the first readily recognizable level of the molten steel, and will be so recognizable by virtually any method of presentation of the data. However, because the broad base of the rounded cusp may be indicative of an uneven topography for the slag, we believe the actual level of the steel might lie somewhere within the right half of the rounded cusp.

A similar result was seen in the second test of a heat on a transfer car, as shown in FIGS. 3c and 3d, which represents a measurement after degasser processing of the steel. FIGS. 3e and 3f are measurements taken before degassing, and likewise in FIG. 3f, the characteristic lobe at about 1.5 meters represents the slag and the level area to its right represents the steel, but we are not certain of their precise distances.

The reader will appreciate that our invention provides an average depth measurement over a large area—that is, the radar signals are read from a large area and the computer processes the distance readings as an average. Such an average over a large portion of an area is far superior to the single point measurement provided by a probe, particularly where the surface is rough. Appropriate correlations to the distance profile can be used by the computer to determine factors such as slag density and surface roughness, and/or these factors can be provided to the computer as inputs to assist in the calculations of thickness. Standard deviations of slag levels and volumes can also be calculated.

Whenever it is deemed desirable, we may use our method of determining the average top surface level of the slag together with more conventional methods of determining the top level of the steel. For example, while the steel rod method of estimating the thickness of the slag is sometimes unreliable because of the topography of the slag and the possibility that the top of the slag may not be hot enough to cause the rod to glow red, the steel rod can usually accurately measure the top level of the molten steel because the lower end of the rod will not survive immersion in the molten steel and the surviving length of rod can be used to determine the level of molten steel. Accordingly this measurement combined with our method of averaging the level of a large portion of the top surface of the slag can readily and accurately be used to calculate the volume of slag.

Our system may also be used to determine the "freeboard", or vessel volume above the slag which is available for additional materials such as deoxidizing agents. For this purpose, we determine the difference between the height of the top of the vessel and the top surface of slag, averaged as explained above, and use the result as a factor together with the dimensions of the vessel to determine the volume available.

EXAMPLE 1

Freeboard Calculation

The following demonstrates the calculation of the freeboard distance (the distance from the top of the molten slag in a ladle to the top rim of the ladle) in a steel mill. For this example, the mechanically measured freeboard distance was 34 inches, which compares well with the calculated freeboard distance of 33.7 inches based on the microwave measurements described below.

First, our program requested a string of data derived from time-of-flight readings from the Ohmart Vega microwave unit. The conical-pattern microwave transmitter, similar to that of FIG. 1, was activated. Signals of 6.3 GHz were used to generate a conical pattern describing a circle on the slag surface. Time-of-flight data were transferred to the computer containing our software via an RS232 serial interface using Ohmart Vega's proprietary V-Bus technology and Vega Connect II software. The received data string was converted to an array and plotted in terms of distance, i.e., a distance profile, from the transceiver (x-axis), and relative amplitude (y-axis) as shown in FIG. 4.

Since it is known that the top of the ladle is a fixed distance approximately (30 elements) from the microwave unit, an automated algorithm searches the microwave data array (the distance profile) for the first maximum (peak) in the array after the $30^{th}$ array element. In this example, this corresponds to approximately 63.9 inches on the x-axis, as shown in FIG. 4. A linear correction factor, based on experience, of $F=(x-34.91)/0.86$, where x is the distance at the peak, was applied to the value to yield the calculated freeboard value. This correction factor was based on data used to calibrate the system, i.e. collected over numerous runs. In this example, the freeboard was calculated to be 33.7 inches, which compares well with the manually measured value of 34 inches.

For ease of visualization of the peak, a parabola is fit through the data using the maximum (x,y) coordinates as the vertex of the parabola, as shown in FIG. 5. An automatic seek routine uses three, four, or five points on either side of the vertex to fit the parabola.

The freeboard calculation is useful for determining the distance a snorkel must move when entering a vacuum deoxygenating vessel to remove oxygen from a steel heat.

EXAMPLE 2

Slag Depth Calculation

Slag depth is calculated using the freeboard measurement and a measurement from a second peak in the microwave data. The second peak required for measurement of slag thickness is determined in the following manner. The derivative of the microwave data (the distance profile as shown in FIGS. 3 and 4) is calculated and plotted next to the microwave data, shown in FIG. 6. The derivative curve is multiplied by 10 to accent the peaks and an arbitrary 50 was added to the values to juxtapose or superimpose the curve on top of the microwave data curve.

Next, to find the next most distant peak, we started at the previously determined peak on the microwave data curve (arrow pointing down, FIG. 6) and moved to the right on the derivative curve from that point to the first peak (arrow point up, FIGS. 6 and 7). The x-value of this next peak (78.1 inches on the derivative profile) was used to find the corresponding location on the microwave data curve. This value (78.1 inches) was considered to be the steel/slag interface. For visualization purposes, a parabola is fit through the data using this new point and 5 points to the right. The resulting parabolic fit is shown in FIG. 7.

Experience has shown that to calculate slag thickness, 7.5 inches is subtracted from the second point (arrow up, FIG. 7, 78.1 inches) and then the raw freeboard value (arrow down, FIG. 4, 63.9 inches) is subtracted from the result. Performing this calculation yields a slag thickness of 6.7 inches. This calculated value based on microwave data compares well with the measured value of 6 inches.

In the above discussion of FIGS. 4–7, it should be noted that the slag, being made up of many discrete particles and phases, thus having large numbers of surfaces and interfaces, subjects the radar to numerous refractions and changes of direction as it passes through in both directions. This tends to delay the transmission of the radar microwaves through the media and this should be taken into account when employing radar for thickness measurements for other materials. The 7.5 inches subtracted as explained above is the empirically determined value for the application of FIGS. 3 and 4. For other materials and configurations, and for combinations of other materials and configurations, the calculation of approximate empirical adjustments of the data is recommended. Likewise, the linear factor $(x-34.91)/0.86$ was derived empirically to correlate the data array with measured results. Similar linear correction factors may be used for different types of slag and for materials other than slag.

Thus, our invention includes a method of determining the distance of a radar transceiver from the top of a layer of a first material on a second material comprising plotting radar microwave time-of-flight data, or data derived therefrom, from said transceiver to said first material and return on a distance axis with respect to an axis representing relative amplitude of said time-of-flight data, identifying the first peak thereafter in said data with respect to said relative amplitude, and determining said distance of said radar transceiver from said first material by the position of said peak on said distance axis.

Our invention also includes a method of determining the thickness of a first material having a substantially planar surface on top of a substantially planar surface of a second material comprising emitting microwave radar from a transceiver therefor in a geometric, preferably conical, pattern toward said first material, analyzing time-of-flight data for said radar emissions to identify a relative amplitude peak near an estimated first approximate distance which is the estimated approximate distance of said transceiver from said top of said first material, analyzing said data for data representing the next most distant relative amplitude peak from said transceiver, and subtracting said first distance from said second distance to determine said thickness of said first material. Persons skilled in the art will realize that the data correlated to the distance axis are placed there as a function of the time-of-flight analysis after discarding false echoes and the like.

As indicated above, the dielectric constants and the conductivities of the measured materials affect the measurements considerably. Good conductivity is correlated with good reflectivity. Thus a highly conductive material on top renders a reading of the surface of the lower material more difficult. Conversely, it is advantageous for the material underneath to have a conductivity significantly greater than that of the material on top. This is the case for slag on top of steel. If both materials are substantially nonconductive, then it is beneficial for the lower material to have a high dielectric constant, at least 20. Preferably, the upper material will in any case have a dielectric constant of at least 2.

The strength of the signal, i.e. the power used to project it, will not affect the percentage of the signal reflected by a particular material or a facet of it. But the ability to penetrate a given material improves inversely with frequency. That is, a lower frequency provides an enhanced depth of penetration.

Because a major objective of our invention is to more accurately determine the quantity of slag conditioning agents needed in steelmaking, a variant of our invention is to complement our measurements with an analysis for concentration of iron oxide in the slag The most common slag conditioning agents are aluminum, calcium carbide, and silicon, which are employed as deoxidizing agents for oxides likely to be present in slag, such as iron oxide and, to a lesser extent manganese oxide. While iron oxide affects the conductivity of the slag (it makes it slightly more conductive) we do not normally need to adjust our calculations for the conductivity of the slag to determine the total slag conditioning agents to be added after the volume of slag is known.

Multiple measurements may also be taken by moving the microwave head to more than one location, preferably at the same distance, above the target material. This permits a more accurate estimate of the upper material thickness, by providing more data on different circular areas; the data should of course be manipulated to take the different positions and distances into account.

Figure 7B:
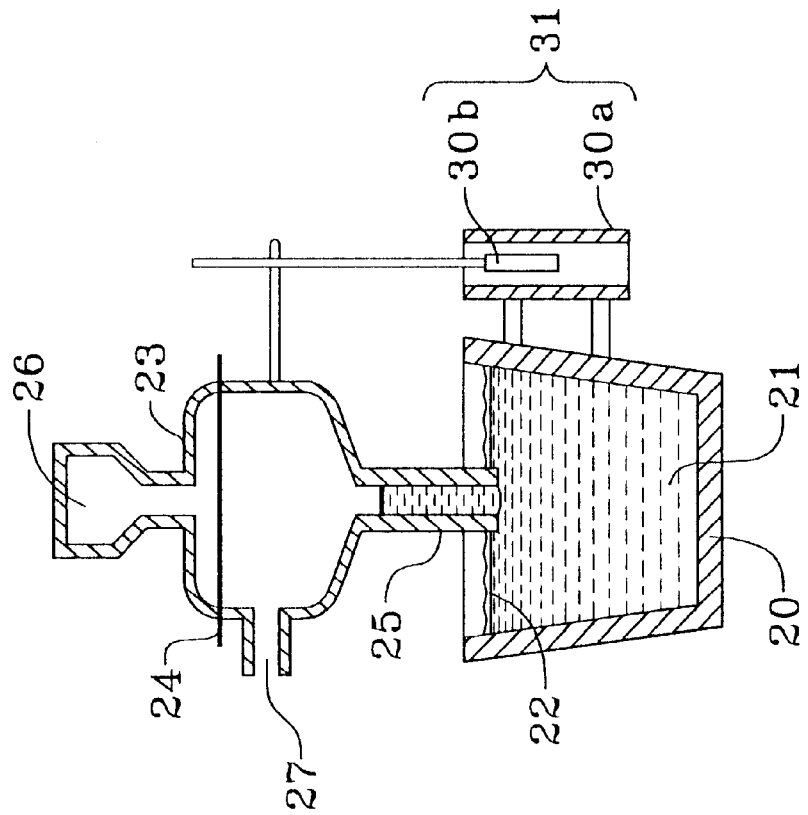
FIGS. 7a and 7b illustrate the two main positions of a conventional D-H (Dortmund-Horder) degasser, equipped with an optional linear variable differential transformer for reporting vertical position according to our invention.
Figure 7A:
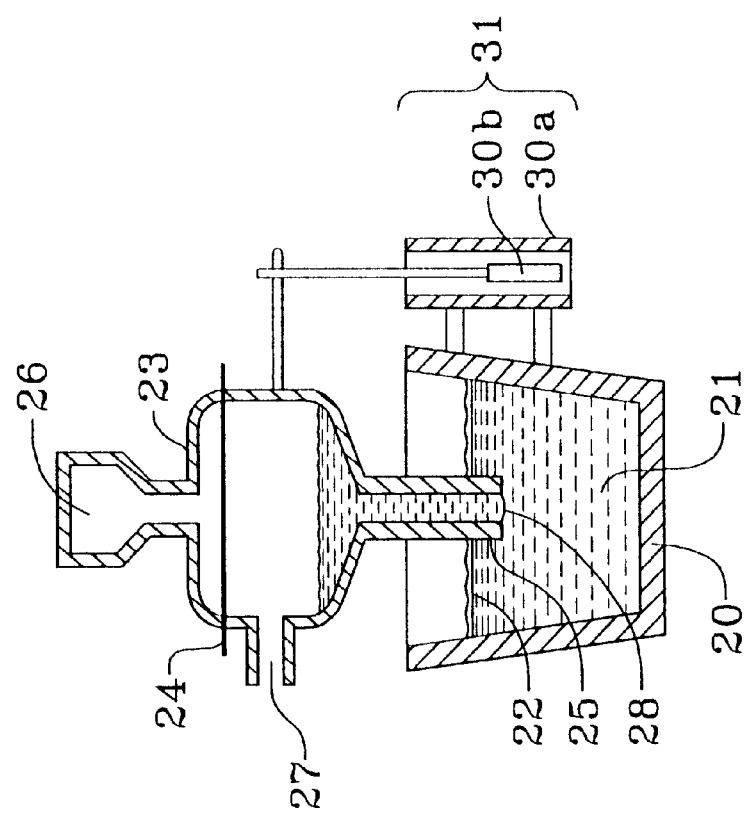

Referring now to FIGS. 7a and 7b, ladle 20 contains molten steel 21 to be degassed. On the molten steel is a layer of slag 22. The degassing apparatus comprises a vacuum chamber 23, a heating rod 24, a snorkel tube 25, an additive disperser 26 and a vacuum outlet 27, all of which are conventional. Vacuum chamber 23 is lined with refractory, not shown, and preheated. Snorkel tube 25 may have a screen 28 on it to minimize the passage of slag into the snorkel tube 25. In FIG. 7a, a vacuum has been drawn through vacuum outlet 27 and the atmospheric pressure has accordingly forced a quantity of molten steel into vacuum chamber 23, and gases dissolved in the steel are drawn into the atmosphere of vacuum chamber 23 and out vacuum outlet 27. The vacuum chamber 23 is then raised and the vacuum released, permitting the degassed steel to flow back into the ladle as illustrated in FIG. 7b. The vacuum chamber 23 and snorkel tube 25 are again lowered and vacuum increased to again achieve the positions illustrated in FIG. 7a. This process may be repeated several times or as many as fifty times or more.

Our invention minimizes the problem of slag contamination, corrosion, and refractory damage caused by inaccurate placement of the snorkel tube 25. Through the use of our slag thickness determinations described herein, we are able to move the degasser and/or ladle the desired relative distance toward each other so that the snorkel is placed at the optimum depth in the ladle each time steel is drawn into vacuum chamber 23. We may determine the distance the ladle moves with respect to the ladle in various ways. Perhaps most simply, the distance moved can be read out from a gearbox not shown. The ladle, however, may be in a slightly different position each time degassing is begun. Note also that the level of steel 21 and slag 22 is different in FIGS. 7a and 7b due to the variation in volume of steel in vacuum chamber 23. It is therefore preferred to include in the distance reading a transducer-generated factor representing the position of the ladle, and to this end we attach cylindrical coil 30a to ladle 20 and cylindrical shaft 30b to vacuum chamber 23. Together, cylindrical coil 30a and cylindrical shaft 30b make up Linear Variable Differential Transformer 31, sometimes referred to herein as LVDT 31, a known type of position transducer. LVDT 31 generates an electronic signal representing the relative positions of the snorkel tube 25 and ladle 20. This signal is sent to a microprocessor, computer or controller not shown which compares the position of snorkel tube 25 with that of the slag/steel interface so that the snorkel tube 25 may be positioned at the desired height in ladle 20. Preferably the terminus of snorkel tube 25 will be arrested in its upward movement at a point as shown in FIG. 7b about 5 to 7 inches below the surface of molten steel 21—that is, below the slag 22. The optimum immersion depth for both positions 7a and 7b take into account the available freeboard volume as well as slag thickness. We prefer to fill the degasser as closely as practicable to the same volume for each fill or cycle in order to minimize refractory damage. The volume may vary from facility to facility depending on the size of the ladle as well as variations in the steel and slag volume. Degassing efficiency is enhanced, refractory performance is extended, and achieving consistent metal height within degassing chamber 23 will enhance the ability to remove carbon, nitrogen and, to some extent, hydrogen in the steel.

During degassing, additives such as ferrosilicon, aluminum, carbon and ferromanganese may be dispensed from additive dispenser 26, the mechanism for which is known in the art.

Figure 8:
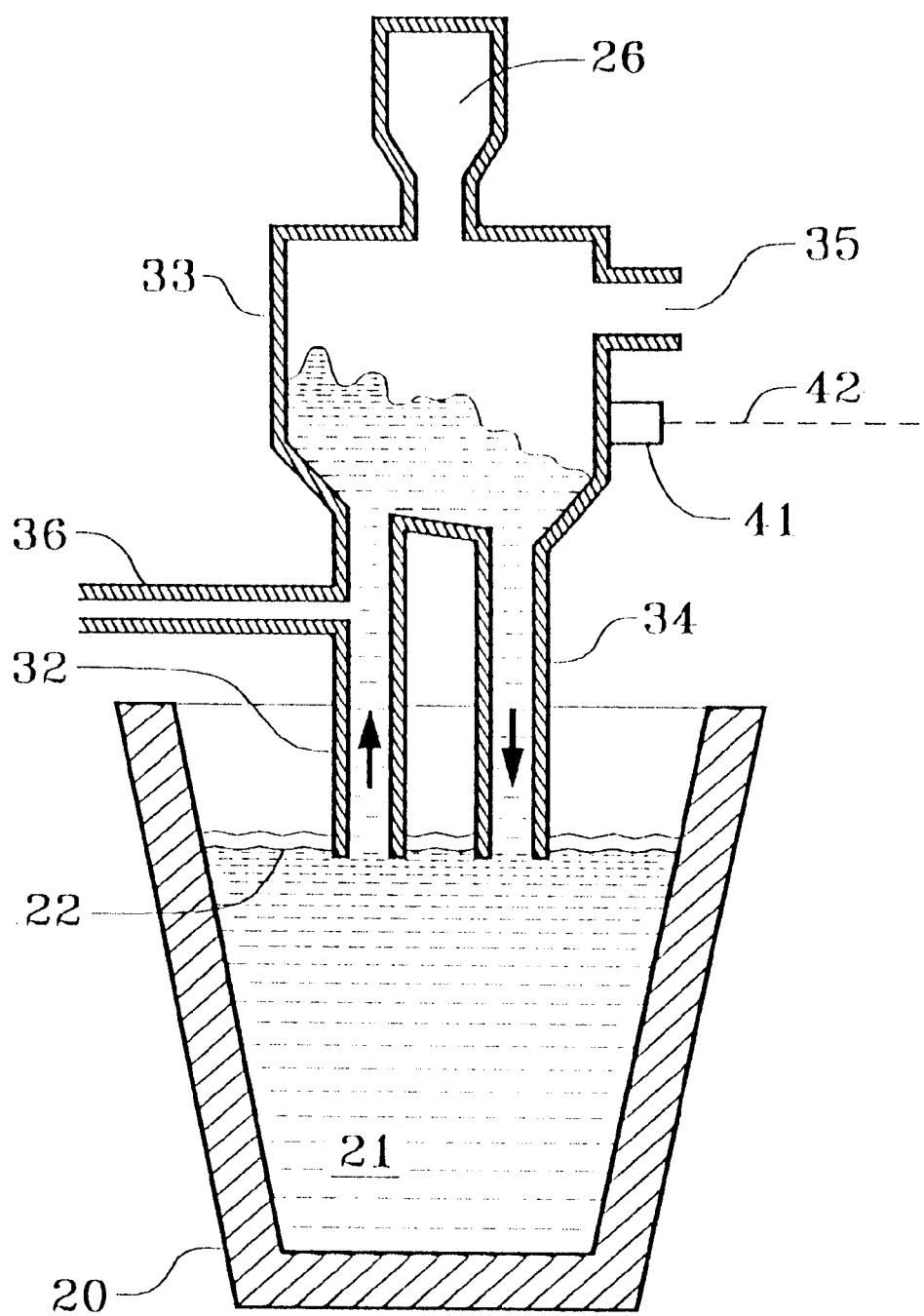
FIG. 8 shows, schematically, a conventional R-H (Ruhrstahl-Heraeous) degasser, equipped with an optional laser device for determining vertical position according to our invention.

Referring now to FIG. 8, in this system the molten steel 21 is circulated from beneath slag 22 upward through snorkel tube 32, into vacuum chamber 33 and returned through snorkel tube 34 to ladle 20. The circulation of the steel is effected by a vacuum drawn through vacuum outlet 35 and the introduction of inert gas such as argon through inlet 36. Again, the vacuum chamber 33 is preheated and the molten steel may be superheated to temperatures from 75 to 100° F. over tapping temperatures. In the past it has been considered desirable that the terminus of each snorkel tube 32 and 34 be about 6 inches below the surface of the molten steel, but this depth has been used more or less to assure the snorkel is actually in the steel. Our process permits a shallower positioning of the snorkels, where desired, because of the improved knowledge of the steel level. The molten steel is circulated as described for a period calculated to efficiently remove dissolved gases from it, and additives may be dispensed throughout the process, or at any stage thereof, from additive dispenser 26 as is known in the art.

In FIG. 8, an optional laser beam generator 41 is positioned on degassing chamber 33. Laser beam 42 may be directed at a stationary receiver, not shown, to determine the actual vertical position of the degasser.

Figure 9:
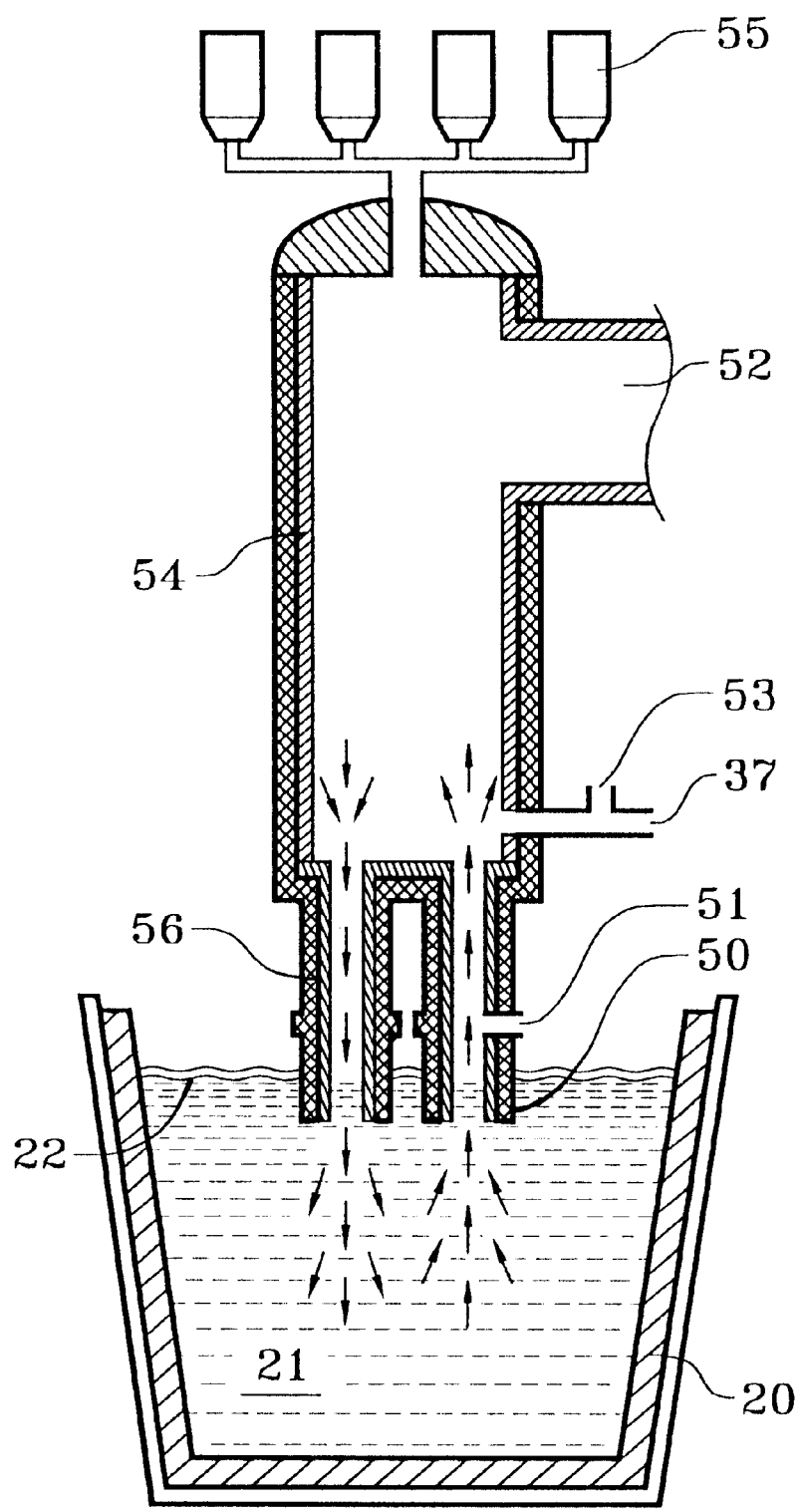
FIG. 9 is an illustration of a RH-OB degasser equipped with an optional alternate laser device for determining vertical position.

In FIG. 9, it will be seen that the RH-OB process is similar to the R-H process (FIG. 8) except that oxygen is introduced through oxygen inlet 37 to assist in decarburization of the steel. The steel is circulated up snorkel tube 50 assisted by argon injected from argon inlet 51 and vacuum at exhaust 52. Additional argon may be introduced at inlet 53. The steel descends by gravity through snorkel tube 56. Vacuum chamber 54 is usually equipped with alloy addition hoppers 55, which may be used more or less conventionally with our invention. Generally, there will be more CO in the gases removed because of this. Argon or other inert gas introduced through inlet 38 aids in the agitation of the metal, shown ascending in snorkel tube 39 and descending by gravity in snorkel tube 40. The actual position of the vacuum chamber 54 and/or snorkel tubes 50 and 56 may be determined by the use of stationary laser beams, not shown, which are broken at various vacuum chamber positions.

What is claimed is:

1. Method of positioning a vacuum degasser in a ladle of molten metal covered by slag, wherein molten metal is drawn into said vacuum degasser by a vacuum applied through a tube having a molten metal intake end, comprising directing a radar beam from above said ladle onto about 1% to about 80% of the surface area of said slag, determining the level of molten metal in said ladle and under said about 1% to about 80% of said surface area of said slag by analyzing the echoes of said radar, and controlling the lowering of said tube intake end into said molten metal at least partly by a signal representing said level as determined by radar.

2. Method of claim 1 wherein the lowering of said tube intake end is also controlled at least partly by a signal representing location of said degasser or said molten metal intake end of said tube.

3. Method of claim 1 including, after said tube intake end is lowered into said molten metal, further applying vacuum to said tube intake end to draw molten metal into said vacuum degasser, removing gases dissolved in said molten metal by said vacuum, and permitting said molten metal to drain back into said ladle.

4. Method of claim 3 repeated in a plurality of iterations while said tube intake end is immersed in said molten metal.

5. Method of claim 3 including dispensing additives to said molten metal in said vacuum degasser.

6. Method of claim 1 wherein said vacuum degasser includes a molten metal drain tube, and including controlling the lowering of said drain tube into said molten metal at least partly by a signal representing said level as determined by radar.

7. Method of claim 6 wherein molten metal is circulated into and out of said vacuum degasser through said tube intake end and said drain tube.

8. Method of claim 1 including collecting echoes of said radar from said 1% to said 80% of said surface of said slag, converting said echoes to data for computing the average distance of said surface, and computing the average level of said slag from said echoes so collected.

9. Method of claim 1 wherein the level of molten metal is determined by directing microwave radiation from a location above said slag, receiving microwave reflections from said steel, measuring the time of flight of radiation reflected by the surface of said steel to said location, and converting said time of flight to a distance from said radar transceiver.

10. Method of degassing molten steel in a ladle including a layer of molten slag thereon comprising directing microwave radiation toward about 1% to about 80% of the area of said molten slag, receiving microwave echoes therefrom, analyzing the time of flight of said microwave radiation and said echoes to locate a point of juxtaposition of two dissimilar parts of a distance profile within an estimated range of vertical distance, generating a control signal as a function of said point of juxtaposition, utilizing said control signal at least partly to position a degasser on said ladle, and degassing said molten metal with said degasser.

11. Method of claim 1 wherein said radar beam is directed to about 1–80% of the surface area of said slag.

12. Method of claim 1 wherein said radar beam is directed to about 1–50% of the surface area of said slag.

13. Method of claim 10 wherein said microwave radiation is directed toward about 1% to about 50% of said slag area.

14. Method of claim 10 wherein said microwave radiation is directed toward about 3% to about 20% of said slag area.

* * * * *

UNITED STATES PATENT AND TRADEMARK OFFICE
CERTIFICATE OF CORRECTION

PATENT NO. : 6,255,983 B1
DATED : July 3, 2001
INVENTOR(S) : Meszaros, Kemeny, Walker, Zaranek, Mannion Page 1 of 1

It is certified that error appears in the above-identified patent and that said Letters Patent is hereby corrected as shown below:

Correct middle initial for David J. Walker from J. to I. Name should read:
-- David I. Walker --.

Signed and Sealed this

Nineteenth Day of March, 2002

Attest:

Attesting Officer

JAMES E. ROGAN
Director of the United States Patent and Trademark Office